(12) United States Patent
Matsuda et al.

(10) Patent No.: US 7,619,677 B2
(45) Date of Patent: Nov. 17, 2009

(54) ELECTRONIC CAMERA ADJUSTING SIZE OF IMAGE TO FIT DISPLAY AREA

(75) Inventors: Norihisa Matsuda, Tokyo (JP); Ryosuke Ogura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 470 days.

(21) Appl. No.: 11/489,608

(22) Filed: Jul. 20, 2006

(65) Prior Publication Data

US 2007/0024736 A1 Feb. 1, 2007

(30) Foreign Application Priority Data

Jul. 21, 2005 (JP) ............... 2005-211735

(51) Int. Cl.
*H04N 5/222* (2006.01)
(52) U.S. Cl. .............. 348/333.12; 348/333.01
(58) Field of Classification Search .......... 348/373, 348/173, 333.01–333.13
See application file for complete search history.

(56) References Cited

U.S. PATENT DOCUMENTS

| | | | | |
|---|---|---|---|---|
| 6,710,781 | B1 * | 3/2004 | Saito ............... | 345/619 |
| 6,834,127 | B1 * | 12/2004 | Yamamoto ............ | 382/282 |
| 7,110,040 | B1 * | 9/2006 | Misawa .............. | 348/373 |
| 2005/0184972 | A1 * | 8/2005 | Tashiro et al. ....... | 345/173 |
| 2006/0285678 | A1 * | 12/2006 | Ota ................. | 379/433.01 |
| 2007/0097089 | A1 * | 5/2007 | Battles ............. | 345/173 |

FOREIGN PATENT DOCUMENTS

JP 11-289484 A 10/1999

* cited by examiner

*Primary Examiner*—Nhan T Tran
*Assistant Examiner*—Mekonnen Dagnew
(74) *Attorney, Agent, or Firm*—Birch, Stewart, Kolasch & Birch, LLP

(57) ABSTRACT

A rear side of an electronic camera is provided with an LCD to display a taken image. When a user does not touch the LCD, the taken image is displayed on an entire screen of the LCD. When the user touches the LCD, a contact position is detected by a touch sensor. A display area of the taken image is determined so as to evade the contact position. Under a first display mode, the display area is determined so as to have an aspect ratio identical with that of the taken image and so as to be maximized. The taken image to be displayed is reduced in a size corresponding to the display area. Under a second display mode, the display area is determined so as to have a maximum rectangular shape. The taken image of which a region protruding from the display area is cropped is displayed.

17 Claims, 10 Drawing Sheets

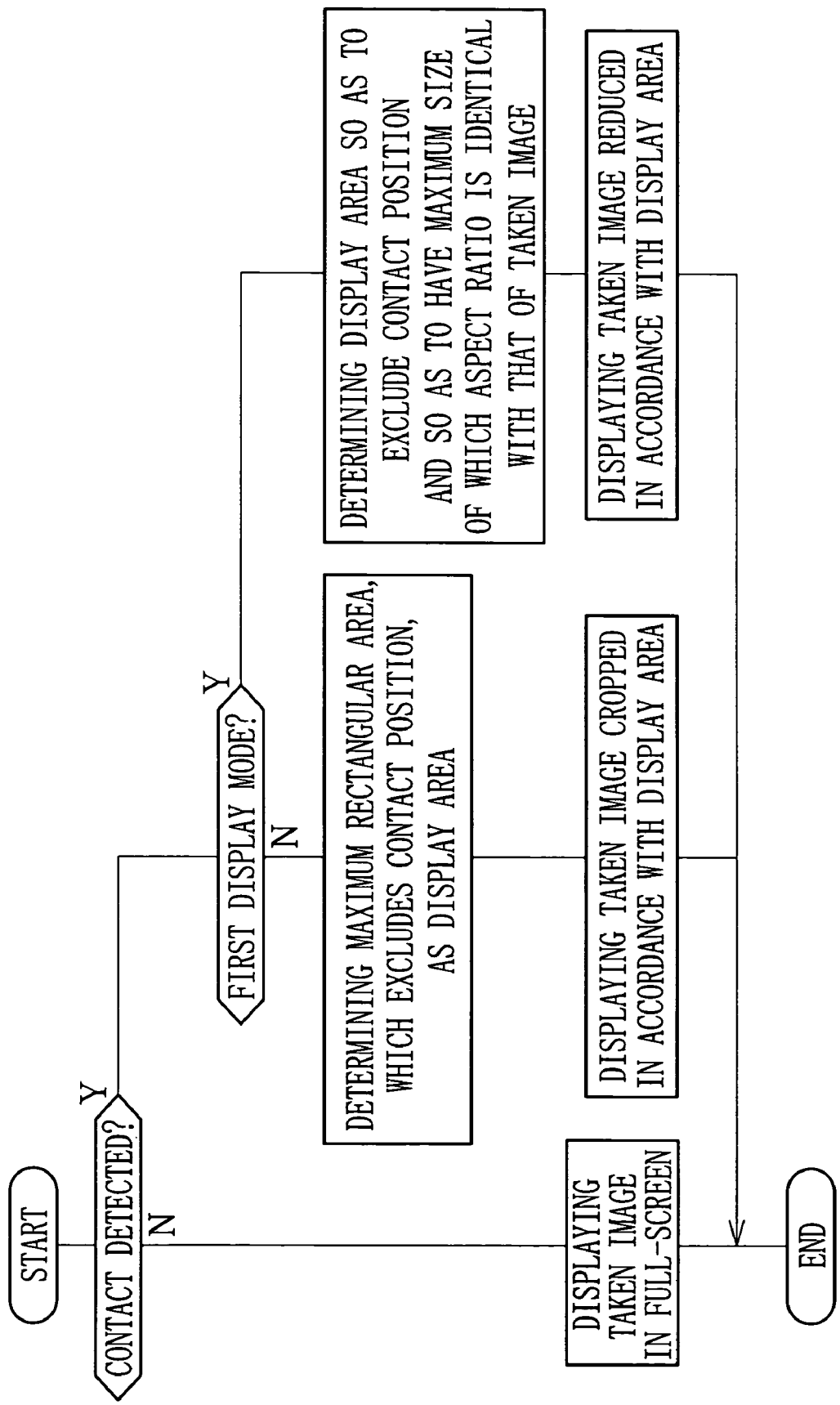

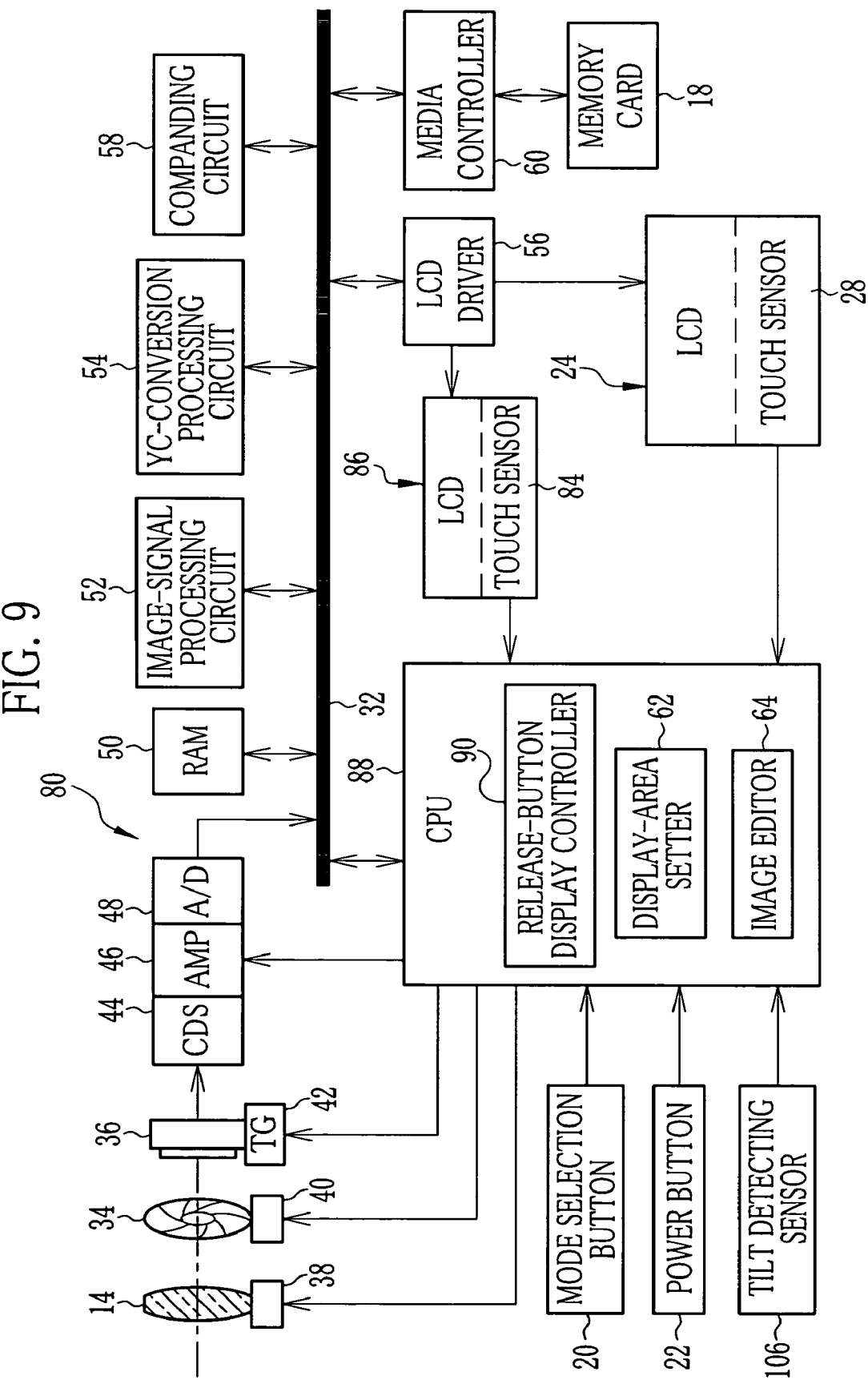

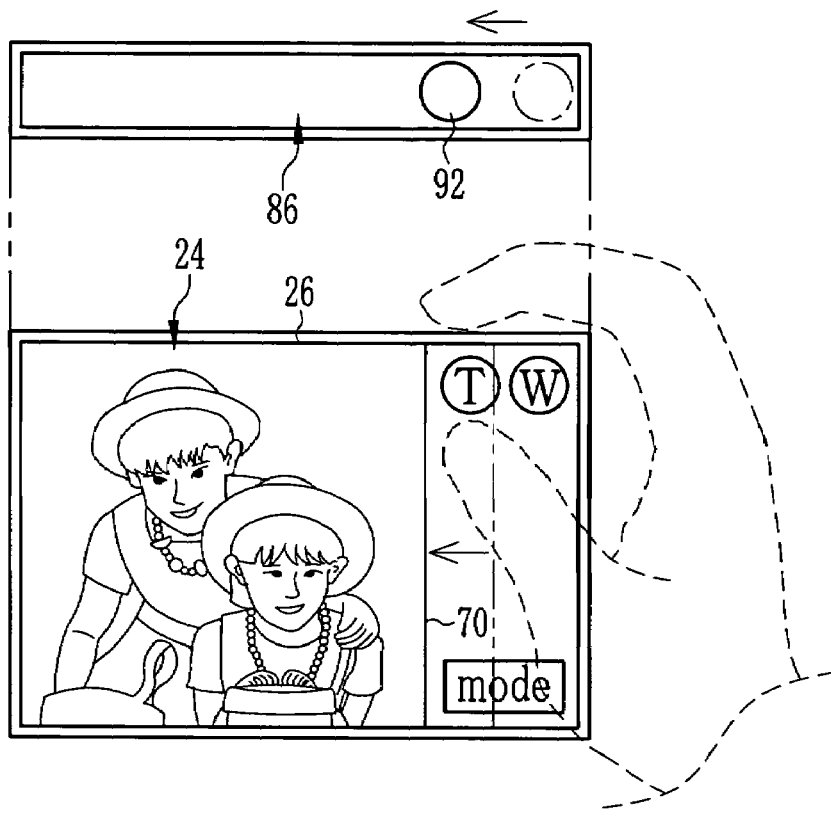
FIG. 10B
FIG. 10A
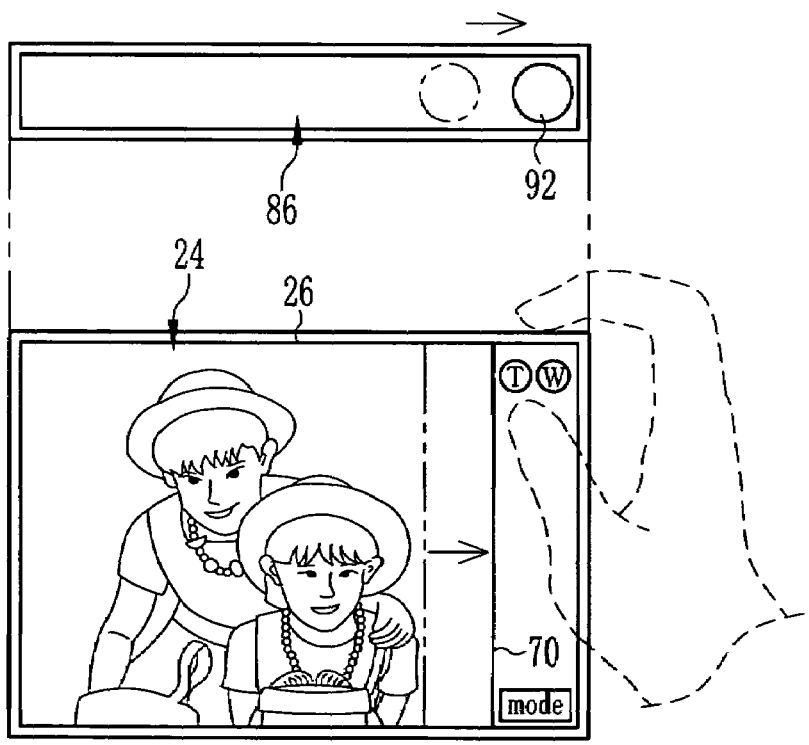
FIG. 11B
FIG. 11A

ELECTRONIC CAMERA ADJUSTING SIZE OF IMAGE TO FIT DISPLAY AREA

FIELD OF THE INVENTION

The present invention relates to an electronic camera for capturing a taken image as digital data and for reproducing the taken image.

BACKGROUND OF THE INVENTION

An electronic camera for converting a taken image into digital data is known. In this kind of the electronic camera, the image is taken by an image sensor of a CCD, a CMOS and so forth, and the converted digital data is stored in a memory. The rear of the electronic camera is provided with a display panel of a liquid-crystal display and so forth to display the taken image. At a shooting time, the taken image is displayed on the display panel as a through image. At a reproduction time, the taken image read out of the memory is reproduced on the display panel.

In recent years, the electronic camera has been downsized and a thickness thereof has been reduced. In contrast, the display panel has been enlarged for the purpose of improving visibility and for aggressively display an image. As the display panel becomes large, an area for occupying the back of the camera body inevitably increases. Consequently, a portion for gripping the camera body is relatively reduced. In this case, when it is necessary to stably hold the camera body at the shooting time, a hand gripping the camera body overlaps the display panel and a part of the display panel is covered.

In view of this, there is a proposed camera (see Japanese Patent Laid-Open Publication No. 11-289484, for instance) in which the taken image is displayed on the entire display panel at the reproduction time and is reduced to a predetermined size at the shooting time to form a blank area without displaying the taken image on the grip portion. Moreover, in this camera, the display panel is provided with a touch sensor to work the blank area as an operating portion of the camera.

In the meantime, a size of a hand for gripping the camera body is different every shooter. Further, a position of each finger is different every shooter when gripping the camera body. In spite of this, the blank area of the device described in the above-noted Publication No. 11-289484 has fixed dimensions. For some shooters, the blank area is large. In such a case, the shooter feels dissatisfaction that a size of the displayed image is small. In contrast, for some shooters, the blank area is small. In this case, there arise problems in that it is difficult to grasp the camera body and the finger overlaps the displayed image.

SUMMARY OF THE INVENTION

In view of the foregoing, it is a primary object of the present invention to provide an electronic camera in which a taken image is adapted to be displayed with an optimum size.

In order to achieve the above and other objects, the electronic camera according to the present invention comprises an image display panel, a touch sensor and a display controller. The electronic camera captures a taken image as digital data and reproduces the taken image. The image display panel is disposed at a rear side of a camera body and has a screen whose size is substantially identical with that of the rear side. An image display area for displaying the taken image is defined within the screen such that at least one of a location and a size of the image display area are changeable. The touch sensor is capable of sensing the entire screen and detects a contact position where a hand of a shooter touches the screen. The display controller changes at least one of the location and the size of the image display area so as to evade the contact position by controlling the image display panel in accordance with the contact position.

It is preferable that the display controller enlarges and reduces the image display area in real time in accordance with a change of the contact position.

It is preferable that the display controller displays an operating portion within a blank area located inside the screen and outside the image display area. By touching the operating portion, an operational instruction is inputted.

It is preferable that the display controller executes a first display mode in which the size of the display area is enlarged and reduced in accordance with the change of the contact position so as to keep an aspect ratio identical with that of the taken image. At this time, the taken image to be displayed within the display area is enlarged and reduced so as to coincide with the size of the display area.

Alternatively, it is preferable that the display controller executes a second display mode in which at least one of a vertical size and a horizontal size of the image display area is elongated and shortened in accordance with the change of the contact position. A part of the taken image to be displayed is cropped so as to coincide with the size of the image display area without reducing the taken image.

It is preferable to provide a display-mode switch member for changing the first and second display modes.

The peripheral surface of the camera body excepting the rear side thereof may be provided with a touch operation panel having an operational screen for displaying an operating portion including a release button with which a release operation is performed. An operational instruction is inputted by touching the operating portion.

It is preferable that a display position of the release button is moved in accordance with a touch position of a finger of the shooter within the operational screen.

It is preferable that an image editor is provided to obtain a cropped image by cutting a part of the taken image reproduced on the image display panel. The image editor cuts the taken image of a region designated by touching the image display area.

It is preferable to provide a tilt detecting sensor, which senses a posture of the camera body to detect a tilt amount of the image display panel. The display controller rotates a display condition of the taken image in accordance with the tilt amount of the image display panel so as to keep the proper display condition.

According to the present invention, it is possible to display the taken image in the optimum size regardless of a hand size of the shooter and a position of the gripping finger.

BRIEF DESCRIPTION OF THE DRAWINGS

FIG. 7 is a flowchart showing a display procedure of the taken image

FIG. 9 is a block diagram showing a structure of the electronic camera of the second embodiment;

FIGS. 10A and 10B are explanatory illustrations showing an example of a display position of a release button;

FIGS. 11A and 11B are explanatory illustrations showing another example of the display position of the release button;

DESCRIPTION OF THE PREFERRED EMBODIMENTS

Figure 1:
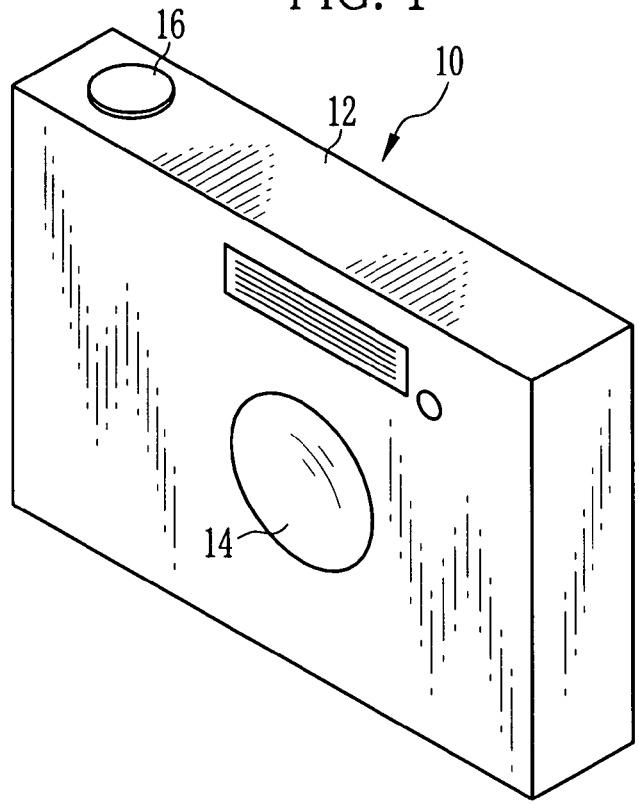
FIG. 1 is a perspective view showing a front side of an electronic camera.
Figure 2:
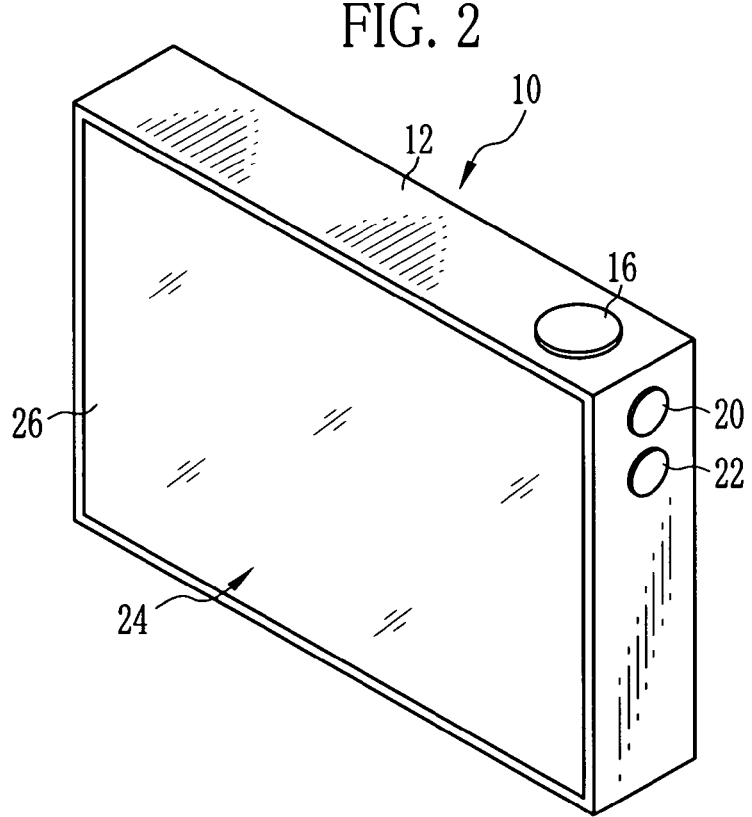
FIG. 2 is a perspective view showing a rear side of the electronic camera.

FIGS. 1 and 2 are perspective views respectively showing a front side and a rear side of an electronic camera according to the present invention. The electronic camera 10 has a camera body 12 formed in a thin parallelepiped shape. A front side of the camera body 12 is provided with a taking lens 14, and a top side thereof is provided with a release button 16. When the electronic camera 10 is set in a shooting mode, subject light focused by the taking lens 14 is captured as a taken image upon depression of the release button 16. The taken image is stored in a memory card 18 (see FIG. 3).

A lateral side of the camera body 12 is provided with a mode selection button 20 and a power button 22. The electronic camera 10 has a reproduction mode for reproducing the taken image stored in the memory card 18, besides the above-mentioned shooting mode. The electronic camera 10 further has a menu mode for performing various kinds of setting. The respective modes are changed by pressing the mode selection button 20. Meanwhile, power supply of the electronic camera 10 is turned on and off whenever the power button 22 is depressed.

A rear side of the camera body 12 is provided with a liquid-crystal display (LCD) 24. A screen 26 of the LCD 24 has a size substantially identical with the rear side of the camera body 12. Under the shooting mode, the LCD 24 works as an electronic viewfinder for displaying the taken image of the subject in real time as a through image. Under the reproduction mode, the LCD 24 works as a monitor for reproducing the taken image recorded in the memory card 18. Under the menu mode, the LCD 24 displays a picture to be used for setting.

The LCD 24 is further provided with a panel-shaped touch sensor 28 (see FIG. 3) for detecting contact positions of a hand and a finger of a shooter. The touch sensor 28 works as a detector for detecting a grip area when the shooter grips the camera body 12. At the same time, the touch sensor 28 works as an operating portion, which is touched to input various operating instructions. Incidentally, an EL (electroluminescence) display may be used instead of the LCD.

Figure 3:
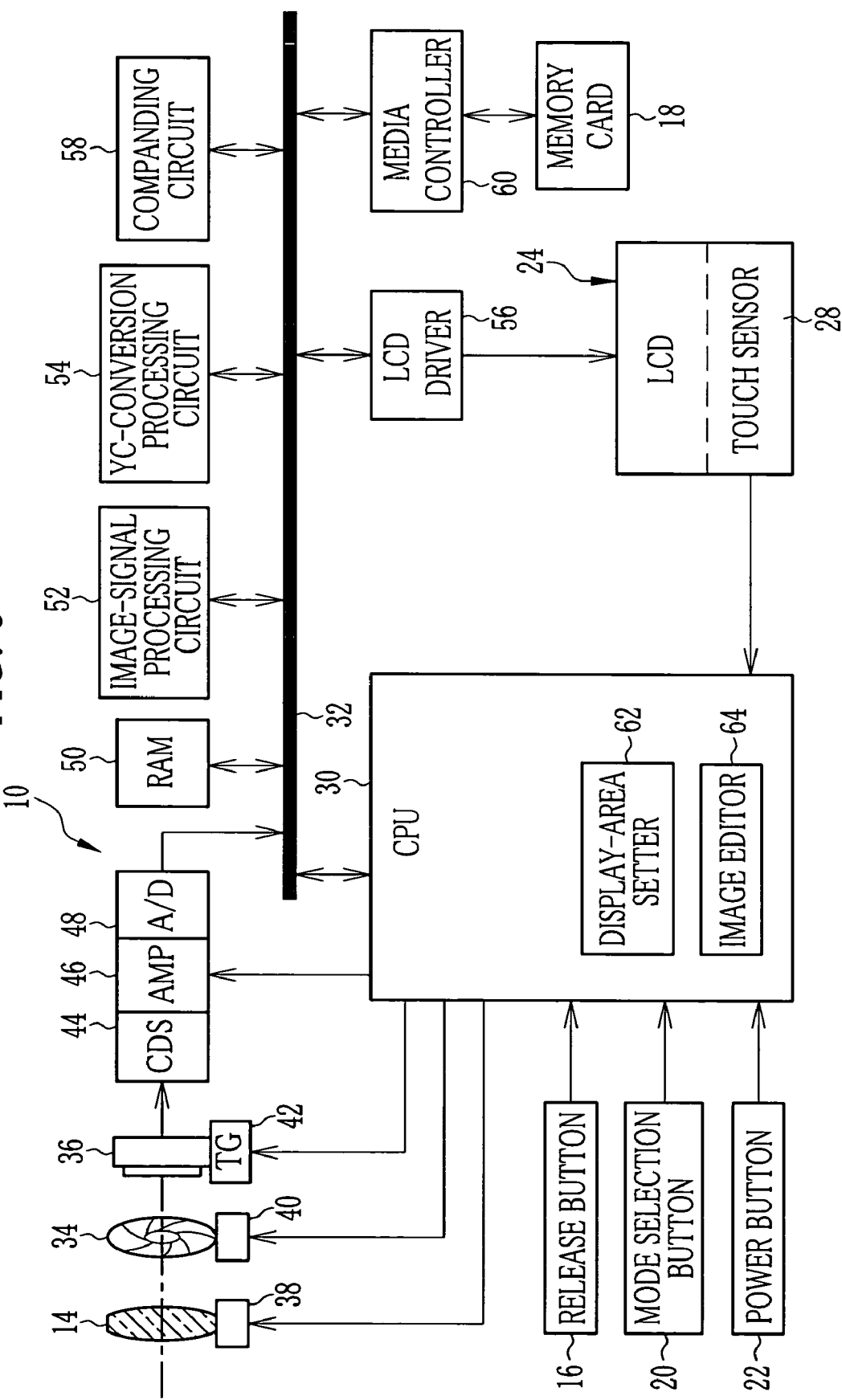
FIG. 3 is a block diagram showing a structure of the electronic camera.

FIG. 3 is a block diagram showing a structure of the electronic camera 10 including a CPU 30 to which each portion of the electronic camera 10 is connected via a data bus 32. The CPU 30 activates and controls the respective connected portions on the basis of signals inputted from the release button 16, the mode selection button 20, the power button 22 and the touch sensor 28.

Behind the taking lens 14, a stop 34 and a CCD 36 are disposed in order. A lens motor 38 is connected to the taking lens 14 and an iris motor 40 is connected to the stop 34. The lens motor 38 moves a zoom lens of the taking lens 14 toward a wide-angle end and a telephoto end to change a zoom magnification. In addition, the lens motor 38 moves a focus lens of the taking lens 14 in accordance with a subject distance and the magnification of the zoom lens to perform focus adjustment so that shooting conditions become optimum. The iris motor 40 actuates the stop 34 to perform exposure adjustment.

Subject light having passed through the taking lens 14 and the stop 34 is focused on a light-receiving surface of the CCD 36. A plurality of light-receiving elements are arranged on the light-receiving surface of the CCD 36 to respectively accumulate a charge in accordance with an amount of the received light. The CCD 36 outputs the charge accumulated in each of the light receiving elements, as an image signal. A timing generator (TG) 42 controlled by the CPU 30 is connected to the CCD 36, which is activated on the basis of timing signals (clock pulses) inputted from the TG 42.

The image signal obtained by the CCD 36 is inputted into a correlation double sampling circuit (CDS) 44 and is outputted therefrom as image data of R, G and B correctly corresponding to the accumulated charge amount of the respective light-receiving elements of the CCD 36. The image data outputted from the CDS 44 is amplified by an amplifier (AMP) 46, and then is converted into digital image data by an A/D 48. The digital image data outputted from the A/D 48 is temporarily stored in a RAM 50 used as a working memory.

An image-signal processing circuit 52 accesses the image data stored in the RAM 50 to perform various image processes, for example gradation conversion, white-balance correction and gamma correction. Further, a YC-conversion processing circuit 54 converts the image data, for which the various image processes have been performed, into a brightness signal Y and color-difference signals Cr and Cb.

Under the shooting mode, the CCD 36 takes an image at a predetermined frame rate, and the above mentioned image processes are performed for the obtained image data. The processed image is displayed on the LCD 24 as a live through image. The LCD 24 is driven by an LCD driver 56 comprising an image memory and a D/A converter. The taken image temporarily stored in the image memory is converted by the D/A converter into an analog signal of NTSC format, for example. The converted analog signal is outputted to the LCD 24.

Upon depressing the release button 16 under the shooting mode to perform a release operation, the CCD 36 captures full image data, which has a larger number of the pixels in comparison with the live image displayed as the through image. For this full image data, the above mentioned image processes are performed. After that, the processed image is compressed by a companding circuit 58 in a predetermined compression format (JPEG format, for example). The compressed image is stored in the memory card 18 via a media controller 60.

Under the reproduction mode, the taken image recorded in the memory card 18 is read out to the RAM 50 and is expanded by the companding circuit 58. The expanded image is outputted to the LCD driver 56 and is reproduced on the LCD 24.

When the touch sensor 28 detects the contact of the hand and the finger of the shooter, the touch sensor 28 outputs a signal representing a contact position, to the CPU 30. As to the touch sensor 28, there are two types in accordance with its placement position. In one of the types, the touch sensor is disposed behind the screen 26. In the other type, the touch sensor is formed from a transparent screen and covers the screen 26 of the LCD 24. Meanwhile, as to methods for detecting the contact, there are a pressure-sensitive method for sensing a change of pressure on a panel, and a static method for sensing an electric signal of static electricity. Any method may be used.

Figure 4:
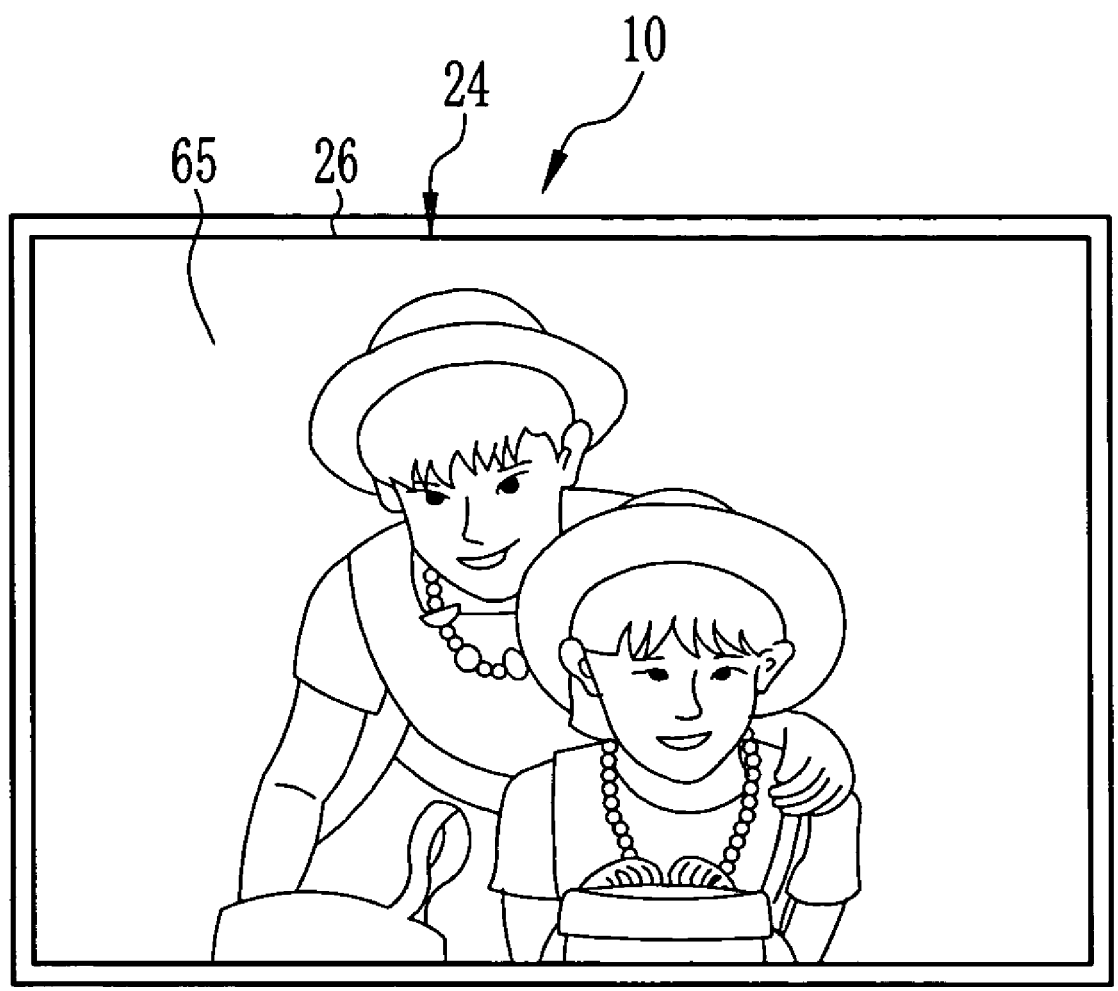
FIG. 4 is an explanatory illustration showing an example of display of a taken image.

When the signal is not outputted from the touch sensor 28, namely when the shooter does not touch the LCD 24, the CPU 30 displays a taken image 65 on the entire screen 26 of the LCD 24 such as shown in FIG. 4. In the meantime, when the signal is outputted from the touch sensor 28, the CPU 30 determines a display area for the taken image so as to evade the detected contact position. The taken image is displayed within the determined display area.

The CPU 30 includes a display-area setter 62 and an image editor 64 for editing the taken image in accordance with the display area determined by the display-area setter 62. The CPU 30 activates the display-area setter 62 and the image editor 64 to control the image to be displayed on the LCD 24 under each of first and second display modes wherein the display area is determined by different methods.

Figure 5A:
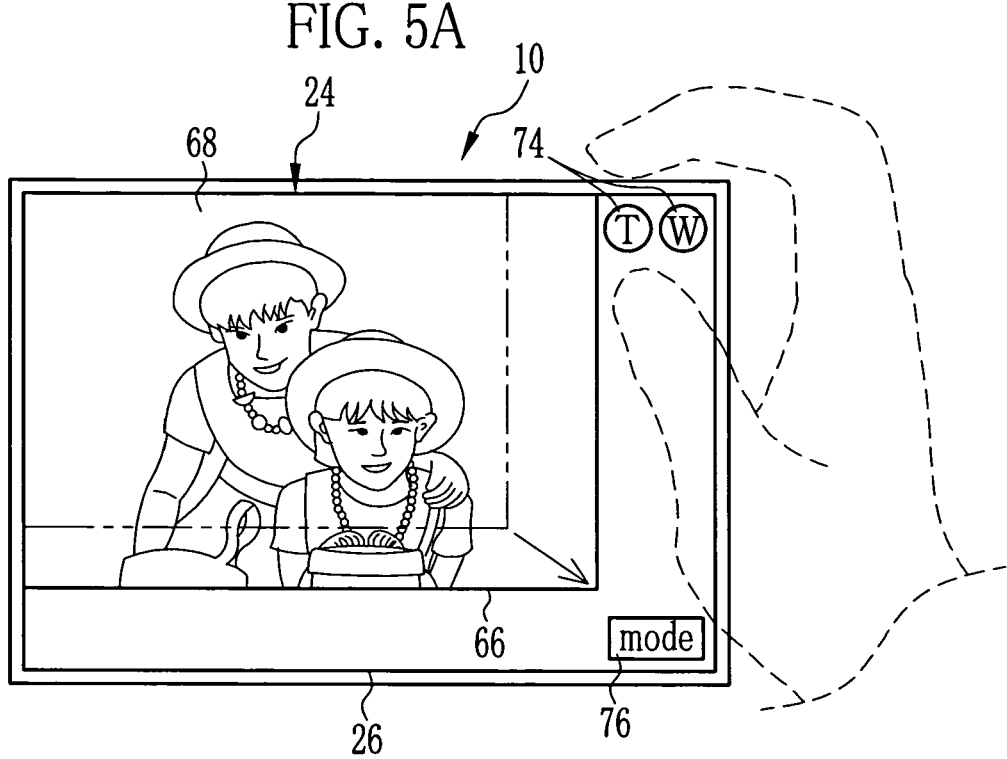
FIGS. 5A and 5B are explanatory illustrations showing another embodiment of the display of the taken image.
Figure 5B:
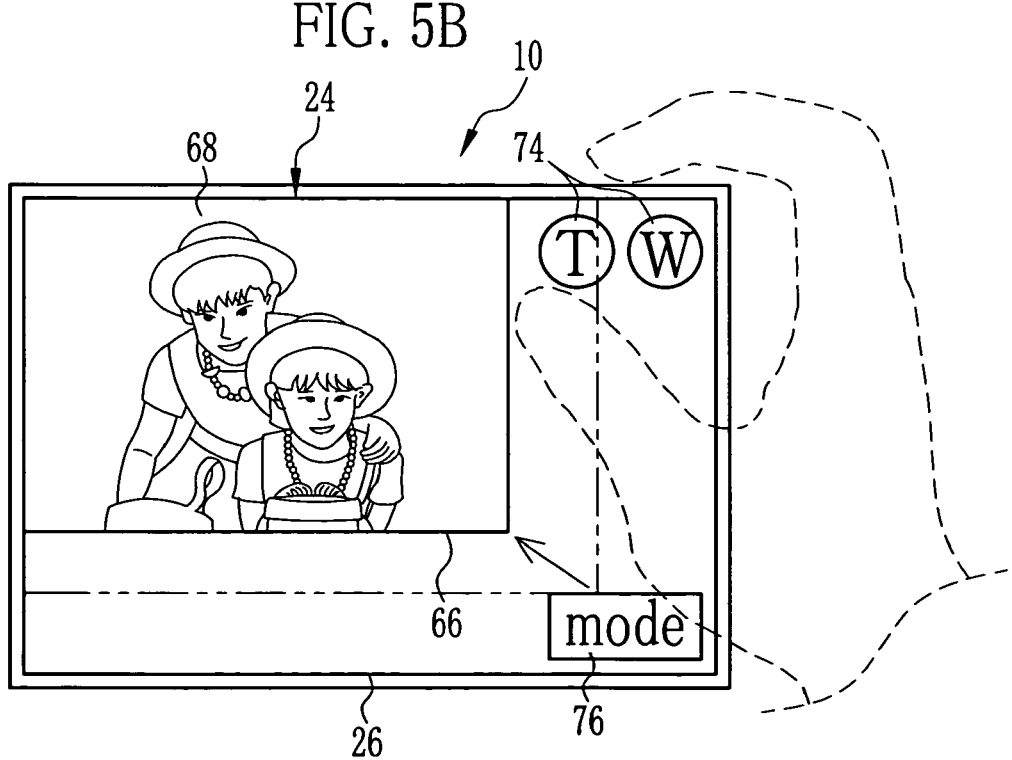

As shown in FIGS. 5A and 5B, under the first display mode, the display-area setter 62 determines the maximum area, which excludes the contact position and has an aspect ratio identical with that of the taken image, as a display area 66. The image editor 64 enlarges or reduces the taken image so as to coincide with the display area. And then, the CPU 30 displays the processed image 68 within the display area 66. Determining the display area and displaying the processed image are performed in real time in association with the change of the contact position.

Figure 6A:
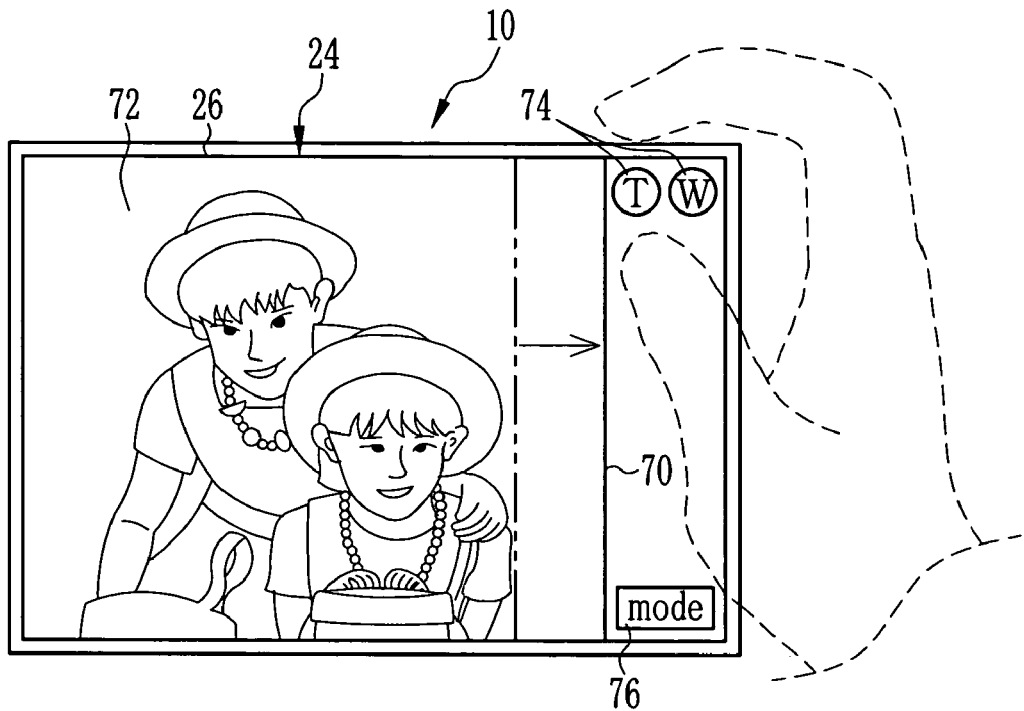
FIGS. 6A and 6B are explanatory illustrations showing the other example of the display of the taken image
Figure 6B:
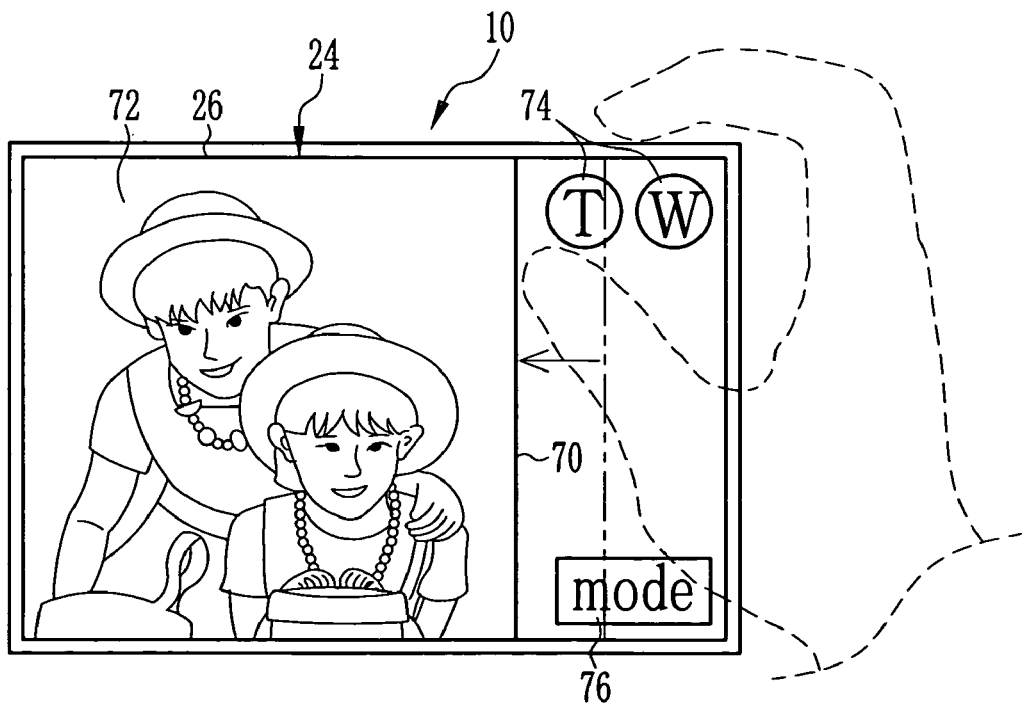

On the other hand, under the second display mode, the display-area setter 62 determines the maximum rectangular area, which excludes the contact position, as a display area 70 such as shown in FIGS. 6A and 6B. The image editor 64 superposes the taken image on the display area 70 so as to make a main part of the taken image (the center of the taken image in this embodiment) coincide with the center of the display area 70. A region of the taken image protruding from the display area is cropped. The CPU 30 displays the remaining taken image 72 on the display area 70. Determining the display area, cropping the taken image and displaying the processed image are performed in real time in association with the change of the contact position, similarly to the first display mode.

As shown in FIGS. 5 and 6, under the first and second display modes, the CPU 30 displays zoom bottoms 74 and a display-mode switch button 76 on a blank area excepting the determined display area. In response to a touch operation of the zoom button 74, the CPU 30 drives the lens motor 38 to change a zoom magnification under the shooting mode, and displays the enlarged taken image or the reduced taken image under the reproduction mode. Further, the CPU 30 changes the first and second display modes in response to a touch operation of the display-mode switch button 76.

Incidentally, under the second display mode, the main part of the taken image coincides with the center of the display area. The main part of the taken image may be decided based on a result of analyzing the taken image. In this case, it is recognized on the basis of the image analysis that a sort of a subject is which of a person, a building and a scene. Moreover, a face position of a subject and a main subject are recognized from shooting composition. Based on such recognition, the main part of the taken image may be decided.

Under the second display mode, the center of the taken image may be fixed to the center of the screen 26. In this case, the region of the taken image to be cropped may be decided in the following manner. The left side of the taken image is cropped when the display area is located at the right side of the screen 26, and the right side of the taken image is cropped when the display area is located at the left side of the screen 26.

An operation of the above structure according to the present invention is described below with a flowchart shown in FIG. 7. The rear side of the electronic camera 10 is provided with the LCD 24 on which the taken image is displayed. When the shooter does not touch the LCD 24, the taken image is displayed on the entire screen of the LCD 24 (see FIG. 4). When the shooter touches the LCD 24, the touch sensor 28 detects the contact position and the display area is determined so as to evade the contact position. The taken image is displayed on the determined display area.

At this time, under the first display mode, the display area is determined so as to have the aspect ratio identical with that of the taken image and so as to maximize its size. The taken image is enlarged or reduced so as to coincide with the determined display area and is displayed thereon (see FIG. 5). Under the second display mode, the display area is determined so as to have the maximum rectangular shape. The taken image of which the region extruding from the determined display area is cropped is displayed (see FIG. 6).

Under the first and second display modes, the zoom buttons 74 and the display-mode switch button 76 are arranged within the blank area excluding the display area. By the touch operation of these buttons, zooming is performed and the display mode is changed.

In this way, the electronic camera 10 displays the taken image so as to evade the contact position when the finger of the shooter touches the LCD. Thus, it is possible to always display the taken image in the optimum size regardless of the hand size of the shooter and the position of the finger gripping the electronic camera. In addition, the operation buttons are displayed within the blank area where the taken image is not displayed. Thus, not only the blank area is effectively utilized, but also operability is improved. Further, there are the first and second display modes adopting different methods for determining the display area on which the taken image is displayed. Thus, the shooter can selectively change the display area so that usability is excellent.

In the above embodiments, the operation buttons for zooming and for changing the display mode are displayed on the LCD provided with the touch sensor. However, various operation buttons for performing other operations may be displayed. Moreover, the display positions of the operation buttons may be properly changed. Further, sorts of the operation buttons to be displayed may be changed in accordance with the size and the shape of the display area, the display mode, the shooting mode and the reproduction mode. It is needless to say that the sorts of the operation buttons and the display positions thereof may be decided by the shooter.

Figure 8:
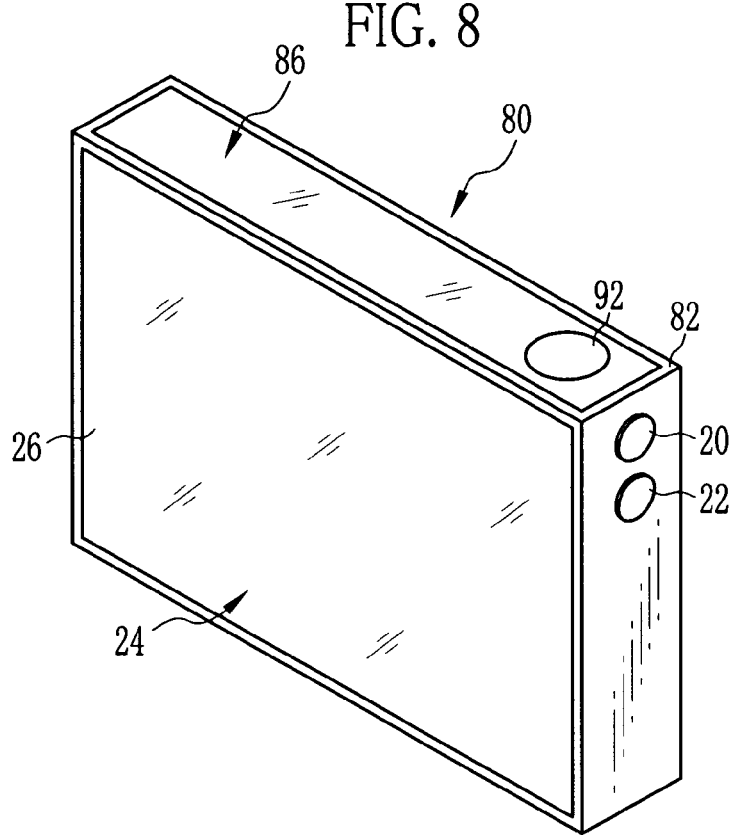
FIG. 8 is a perspective view showing a rear side of an electronic camera of a second embodiment.

In the above embodiments, the LCD provided with the touch sensor is disposed at the rear side of the electronic camera. The present invention, however, is not limited to this. For example, such as an electronic camera 80 shown in FIGS. 8 and 9, a rear side of a camera body 82 is provided with the LCD 24 described in the foregoing, and at the same time, a top side of the camera body 82 is provided with a second LCD 86 including a touch sensor 84 (see FIG. 9). By the way, in FIG. 8 and the succeeding drawings, a component identical with that of the above embodiment is denoted by the same reference numeral and description thereof is abbreviated.

In the electronic camera 80, a CPU 88 includes a release-button display controller 90, which displays a release button 92 (see FIGS. 8, 10 and 11) on the second LCD 86 via the LCD driver 56. The CPU 88 performs the image taking process when the contact position of the finger of the shooter, which is obtained from the touch sensor 84, overlaps with the display position of the release button 92. Further, the CPU 88 activates the release-button display controller 90 on the basis of the contact position detected by the LCD 24. By the release-button display controller 90, the display position of the release button 92 is moved to an easily operable position for the shooter.

In other words, when the hand of the shooter is large, the contact position detected by the LCD 24 is nearer to the center of the screen 26 such as shown in FIG. 10A. In this case, the release button 92 is displayed so as to be nearer to the center of the top side of the camera body 82 such a shown in FIG. 10B. In contrast, when the hand of the shooter is small, the contact position detected by the LCD 24 is nearer to the lateral side of the screen 26 such as shown in FIG. 11A. In this case, the release button 92 is displayed so as to be nearer to the lateral side of the camera body 82 such as shown in FIG. 11B. In this way, the release button is adapted to be easily operated regardless of the hand size of the shooter.

In this embodiment, the display position of the release button is moved on the basis of the contact position detected by the LCD disposed at the rear side of the camera body. However, the display position of the release button may be moved on the basis of the contact position detected by the LCD disposed at the top side of the camera body. In this case, the display position of the release button may be determined when the shooter has touched the top side of the camera body, and shooting may be performed by double-clicking on the displayed release button. As a matter of course, besides the release button, other operation buttons may be displayed on the LCD disposed at the top side of the camera body.

Incidentally, it is possible to edit the taken image, which is recorded in the memory card, on the basis of the signal outputted from the touch sensor. In this case, the shooter traces the taken image reproduced on the LCD with the finger to designate a region to be edited. The taken image included in this designated region is clipped by the image editor. Successively, the CPU stores the clipped image in the memory card as the new image.

Figure 12:
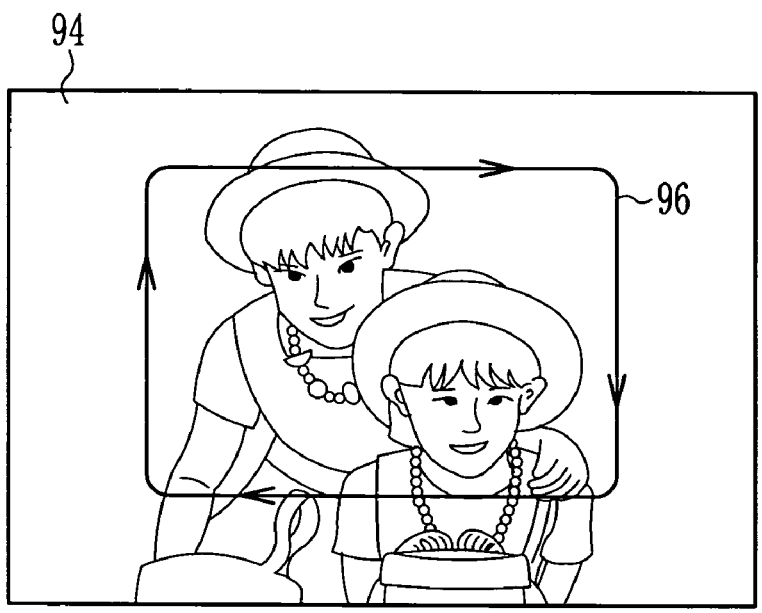
FIG. 12 is an explanatory illustration showing a case in that editing of the taken image is performed.
Figure 13:
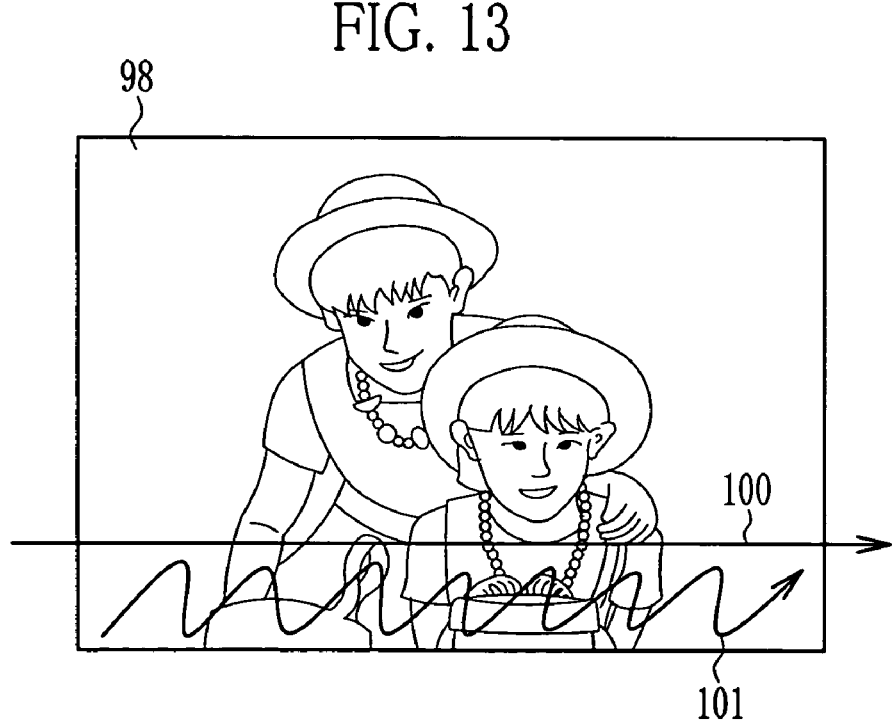
FIG. 13 is an explanatory illustration showing a case in that editing of the taken image is performed.

Concretely, as shown in FIG. 12, the taken image 94 reproduced on the LCD is traced with the finger along a rectangular contour 96 to designate the region. The taken image included in this region (inside portion of the contour 96) is clipped, and the clipped image is stored in the memory card as the new image. In the meantime, as shown in FIG. 13, the taken image 98 reproduced on the LCD is traced with the finger along a straight line 100 to divide the taken image 98 into two regions (an upper region of the straight line 100 and a lower region thereof). By tracing the lower region along a zigzag line 101, the taken image of the lower region is cropped, and the remaining image is stored in the memory card as the new image.

In the above embodiments, the LCD is provided with the touch sensor. However, only the touch sensor may be disposed at the top side and the lateral side of the camera body. When this touch sensor detects the contact of the finger of the shooter, various operational instructions may be inputted into the camera body. In this case, when the touch sensor has detected the contact of the finger of the shooter, a power supply of the electronic camera is turned on, for example. Further, a shooting instruction may be inputted by double-clicking on the touch sensor.

Figure 14:
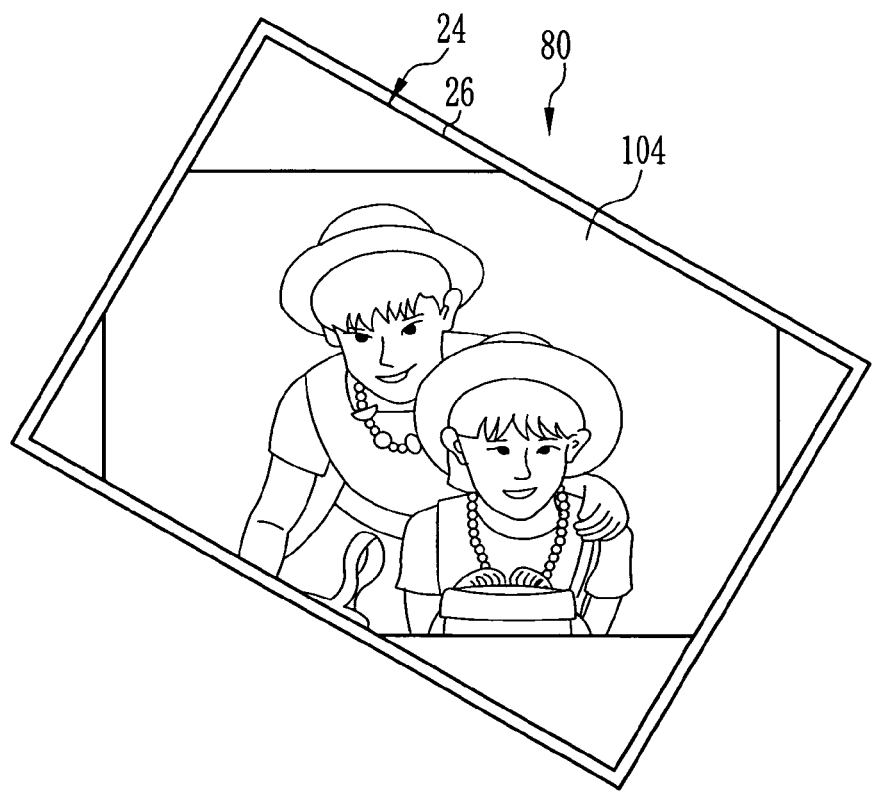
FIG. 14 is an explanatory illustration showing a case in that the taken image is rotated.

Meanwhile, regarding the electronic camera 80, a taken image 104 is rotated such as shown in FIG. 14 so as to be horizontally displayed when the electronic camera 80 is tilted. In this case, the camera body is provided with a tilt detecting sensor 106 (see FIG. 9) of a gyro sensor or the like to detect a tilt amount of the electronic camera. In accordance with the tilt amount obtained from the tilt detecting sensor 106, the CPU 88 rotates the displayed image.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronic camera for capturing a taken image as digital data and for reproducing the taken image, said electronic camera comprising:
   an image display panel disposed at a rear side of said electronic camera and having a screen whose size is substantially identical with that of said rear side, an image display area for displaying the taken image being defined within said screen of said image display panel;
   a touch sensor for sensing the entire screen to detect a contact position where a hand of a shooter touches said screen; and
   a display controller for controlling said image display panel in accordance with said contact position, said display controller changing said image display area so as to evade said contact position wherein said display controller enlarges or reduces said image display area in a condition that an aspect ratio identical with that of the taken image is maintained, and the taken image to be displayed within said image display area is enlarged or reduced in accordance with the changed image display area so as to maintain said aspect ratio;
   a touch operation panel disposed on an outer surface of said electronic camera excepting said rear side, said touch operation panel having an operational screen for displaying an operating portion including a release button with which a release operation is performed, and an operational instruction being inputted by touching said operating portion;
   wherein a display position of said release button is changed in accordance with a change of said contact position.

2. The electronic camera according to claim 1, wherein said display controller changes at least one of a location and a size of said image display area.

3. The electronic camera according to claim 1, wherein said display controller changes said image display area in real time in accordance with a change of said contact position.

4. The electronic camera according to claim 1, wherein said display controller displays an operating portion within a blank area located inside said screen and outside said image display area, an operational instruction being inputted by touching said operating portion.

5. The electronic camera according to claim 4, wherein said operating portion includes a zoom button for zooming the taken image.

6. The electronic camera according to claim 1, wherein said display controller elongates and shortens at least one of vertical and horizontal sizes of said image display area, and a part of the taken image to be displayed within said image display area is cut off in accordance with the changed image display area.

7. The electronic camera according to claim 1, wherein said display controller is provided with a first display mode, in which said image display area is enlarged or reduced so as to maintain an aspect ratio identical with that image and the taken image is enlarged or reduced in accordance with the changed image display area so as to maintain the aspect ration, and a second display mode, in which at least one of vertical and horizontal sizes of said image display area is elongated and shortened and a part of the taken image is cut off so as to fit the taken image into the changed image display area.

8. The electronic camera according to claim 7, further comprising:
   a display-mode switch member for changing said first display mode and said second display mode.

9. The electronic camera according to claim 8, wherein said display-mode switch member is displayed within a blank area located inside said screen and outside said image display area, said first and second display modes being switched by touching said display-mode switch member.

10. The electronic camera according to claim 1, wherein a display position of said release button is moved in accordance with a touch position of a finger of said shooter within said operational screen.

11. the electronic camera according to claim 1, wherein said touch operation panel is disposed on a top side of said electronic camera.

12. The electronic camera according to claim 1, further comprising:
   an image editor for obtaining a cropped image by cutting a part of the taken image displayed on said image display panel, said cropped image being designated by a touch operation of said image display area.

13. The electronic camera according to claim 12, wherein a region of said cropped image is designated by tracing a contour of said cropped image.

14. The electronic camera according to claim 12, wherein a region of said cropped image is designated by tracing a portion excepting said cropped image.

15. The electronic camera according to claim 1, further comprising:
   a tilt detecting sensor for sensing a tilt of said electronic camera to detect a tilt amount of said image display panel, said display controller rotating a display of the taken image to a proper condition in accordance with said tilt amount detected by said tilt detecting sensor.

16. The electronic camera according to claim 15, wherein said display controller rotates the taken image to a horizontal condition when said image display panel is tilted.

17. The electronic camera according to claim 1, wherein said image display panel is a liquid-crystal panel.

* * * * *